(12) United States Patent
Callison et al.

(10) Patent No.: US 11,669,137 B2
(45) Date of Patent: Jun. 6, 2023

(54) POWER DOWN OF POWER OVER ETHERNET INTERFACES

(71) Applicant: HEWLETT PACKARD ENTERPRISE DEVELOPMENT LP, Houston, TX (US)

(72) Inventors: Rachel Callison, Roseville, CA (US); Tsun-Yao Chang, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/388,369

(22) Filed: Jul. 29, 2021

(65) Prior Publication Data
US 2023/0032310 A1 Feb. 2, 2023

(51) Int. Cl.
G06F 1/26 (2006.01)
G06F 1/3209 (2019.01)

(52) U.S. Cl.
CPC ............ G06F 1/266 (2013.01); G06F 1/3209 (2013.01)

(58) Field of Classification Search
CPC .............................. G06F 1/266; G06F 1/3209
USPC ......................................................... 713/300
See application file for complete search history.

(56) References Cited

U.S. PATENT DOCUMENTS

| 7,155,622 | B2* | 12/2006 | Mancey | H04L 12/10 |
| | | | | 713/323 |
| 7,356,588 | B2 | 4/2008 | Stineman, Jr. et al. | |
| 7,640,467 | B2 | 12/2009 | Sumimoto | |
| 9,110,972 | B2 | 8/2015 | Hamdi et al. | |
| 9,667,429 | B2 | 5/2017 | Dwelley et al. | |
| 9,967,104 | B2 | 5/2018 | Gardner et al. | |
| 10,069,636 | B2 | 9/2018 | Yseboodt et al. | |
| 11,372,463 | B1* | 6/2022 | Callison | G06F 1/266 |
| 2006/0053324 | A1* | 3/2006 | Giat | H04L 12/10 |
| | | | | 713/300 |
| 2006/0259792 | A1 | 11/2006 | Dove | |
| 2007/0030613 | A1* | 2/2007 | Sousa | H04W 52/281 |
| | | | | 361/92 |
| 2009/0083552 | A1 | 3/2009 | Hussain et al. | |
| 2010/0106985 | A1* | 4/2010 | Panguluri | G06F 1/266 |
| | | | | 713/300 |
| 2013/0013949 | A1* | 1/2013 | Mohammed | H04L 12/10 |
| | | | | 713/340 |

(Continued)

FOREIGN PATENT DOCUMENTS

| CN | 101820348 A | 9/2010 |
| CN | 102025509 A | 4/2011 |
| CN | 104638646 A | 5/2015 |

*Primary Examiner* — Chun Cao
(74) *Attorney, Agent, or Firm* — Hewlett Packard Enterprise Patent Department

(57) ABSTRACT

Examples described herein relate to improved powering down of PoE interfaces in a network device. In response to detecting a fault that interrupts a flow of power from the PSUs to one or more of the PoE interfaces, the examples determine a total operational power value based on an operational power value of each operational PSU of the PSUs and determine a total available power value based on the total operational power value and a reserved power value. For each of the PoE interfaces, the examples determine whether a threshold power value for the PoE interface exceeds the total available power value and power down the PoE interface in response to determining that the threshold power value for the PoE interface exceeds the total available power value.

20 Claims, 5 Drawing Sheets

(56) References Cited

U.S. PATENT DOCUMENTS

| | | | |
|---|---|---|---|
| 2014/0245031 A1* | 8/2014 | Hamdi | G06F 1/3203 713/300 |
| 2019/0064890 A1 | 2/2019 | Donachy et al. | |
| 2019/0227608 A1 | 7/2019 | Chen et al. | |
| 2019/0278347 A1 | 9/2019 | Goergen et al. | |
| 2019/0312751 A1 | 10/2019 | Goergen et al. | |

* cited by examiner

POWER DOWN OF POWER OVER ETHERNET INTERFACES

CROSS-REFERENCE TO RELATED APPLICATION

The present patent application is related to application Ser. No. 17/179,638 filed on 19 Feb. 2021, which is incorporated by reference herein.

BACKGROUND

Power over Ethernet (PoE) allows an Ethernet cable to be used for both power transmission and data transmission. Devices such as Voice over Internet Protocol (VoIP) phones, Light-Emitting Diode (LED) lights, Internet Protocol (IP) cameras, wireless access points (APs), and Bluetooth Low-Energy (BLE) beacons can be powered by PoE and can therefore be installed in locations where it would be impractical or expensive to install conventional wires used to provide power. Several industry standards exist for PoE devices. For example, the Institute of Electrical and Electronics Engineers (IEEE) has defined at least three industry standards: IEEE 802.3af, which allows up to 15.4 Watts to be delivered over Category 5 (Cat5) Ethernet cables; IEEE 802.3at, which allows up to 30 Watts to be delivered over Cat5 cables; and IEEE 802.3bt, which allows up to 71.3 Watts to be delivered over Cat5 cables. LTPoE++, a proprietary standard, allows up to 90 Watts to be delivered over Cat5 cables. In the IEEE standards, a device that receives PoE is called a Powered Device (PD), while a device that provides PoE is called a Power Sourcing Equipment (PSE).

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Figure 1:
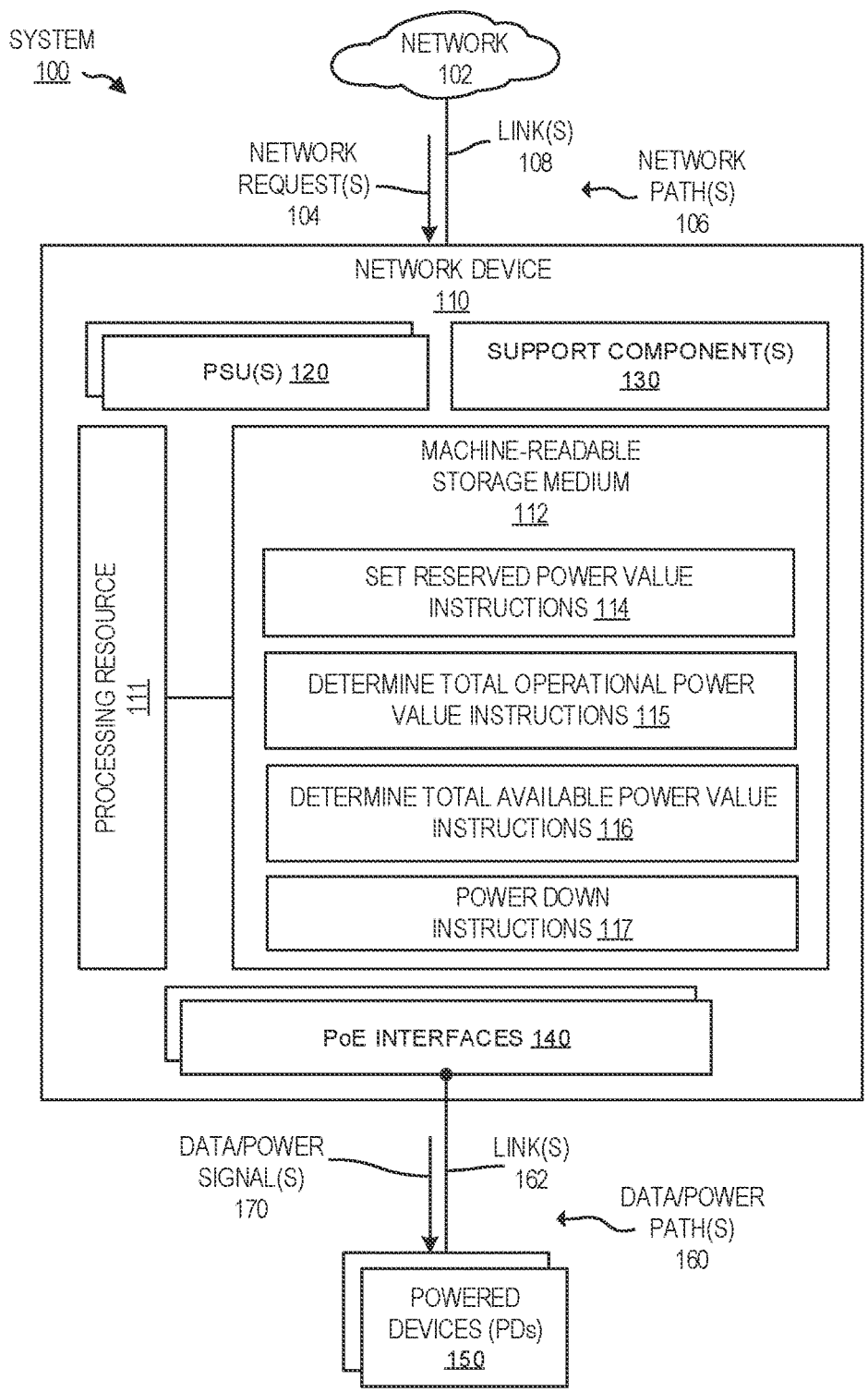
FIG. 1 is a block diagram of a network device for powering down PoE interfaces, in accordance with an example.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing example embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening element, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but is not limited to, the term "including" means including but not limited to. The presence of broadening words and phrases such as "one or more," "at least," "but not limited to" or other like phrases in some instances shall not be read to mean that the narrower case is intended or required in instances where such broadening phrases may be absent.

In industrial network deployments, such as enterprise networks, campus networks, or data center networks (DCNs), several devices may be connected to a network via network devices (e.g., Ethernet switches). A network device may provide PoE for power and data transmissions (referred to herein as 'PoE power and data transmissions') to several PDs. While a single PD may consume a relatively small amount of power delivered via a PoE interface (e.g., Ethernet port), the PDs in the network may collectively consume an amount of power that is significant in terms of the cost and the percentage of overall power used by devices in the network. In some instances, a total amount of power required for such PDs is far greater than the amount of power that is required for network devices to provide data networking functionality (e.g., switching, routing) to the network.

When a network device providing PoE power and data transmissions to PDs loses the power supplied by one or more power supply units (PSUs) due to a fault in a PSU and/or power source outage (hereinafter generally referred to as a "power fault event"), there is a chance that the network will experience an abrupt downtime if an aggregate power load used by the PDs and the network device satisfies a total power output capacity of the remaining operational (i.e., non-faulted) PSUs. Such downtime can lead to a total loss of power and data transmissions for certain types of PDs, which may be costly for applications that require high reliability of PoE power and data transmissions.

To facilitate increased reliability of PoE power and data transmissions during a power fault event, a network device may be configured for PSU redundancy, to receive backup power from one or more independent PSUs which hold power in reserve for use during the power fault event. However, such PSU redundancy may force a trade-off between the power redundancy and the total power output capacity, since the total amount of usable power is reduced as more power output capacity is held in reserve as redundant power via the redundant PSUs. Moreover, such PSU redundancy may protect up to a number of PSUs configured for redundancy and may not easily allow for PSUs of differing power output capacities to be used together to power the network device.

Moreover, some network devices use rapid power down (RPD), a technique to rapidly power down a predetermined number of PoE interfaces during a power fault event or multi-priority rapid power down (MPRPD), a technique to rapidly power down a predetermined number of PoE interfaces based on a power output capacity of a PSU which faults (i.e., faulted PSU). Although these techniques may allow continued operation of certain high-priority PoE interfaces and data networking functions by the network device, such techniques may not support multi-fault conditions, i.e., when more than one PSU faults during a power fault event and/or when multiple power fault events occur. Moreover, in some situations, these techniques may power down more PoE interfaces than necessary to avoid network downtime when a faulted PSU has a lower power output capacity than an operational (i.e., non-faulted) PSU. Furthermore, such RPD techniques may require software-based communication between PSU management and PoE management subsystems on failsafe power when a PSU fault occurs, which may result in more complicated development and verification testing and increased latency between the PSU management and PoE management subsystems.

One or more examples described herein provide improved power down of PoE interfaces and more efficient power utilization of PSUs over existing techniques. The examples may determine an amount of power that is available, from the plurality of PSUs, to be provided to a plurality of PoE interfaces in response to detecting a fault that interrupts a flow of power from the PSUs to one or more of the PoE interfaces. The available amount of power may be determined by taking into account total loss of power due to the fault and the amount of power provided to one or more support components (e.g., line cards, management modules, etc.) of the network device. In this manner, the examples provide an accurate and efficient determination of a total available power that can be provided to the PoE interfaces. In addition, examples described herein may identify one or more of the PoE interfaces that may be powered down based on a threshold power for each of the PoE interfaces and power down the one or more of the PoE interfaces, without requiring software-based communication between a PSU management system and a PoE management system on failsafe power, thereby simplifying the power down process for PoE interfaces and reducing latency.

In some examples, a method for powering down PoE interfaces of a network device is presented. The network device may include a plurality of PSUs that provide power to a plurality of PoE interfaces and one or more support components of the network device. The method may include setting a reserved power value for the network device. In response to detecting a fault that interrupts a flow of power from the plurality of PSUs to one or more of the plurality of PoE interfaces, the method may include determining a total operational power value based on an operational power value for each operational (i.e., non-faulted) PSUs among the plurality of PSUs and then determine a total available power value based on the total operational power value and the reserved power value for the network device. The method may include determining, for each of the plurality of PoE interfaces, whether a threshold power value for the PoE interface exceeds the total available power value, and in response to determining that the threshold power value for the PoE interface exceeds the total available power value, powering down that PoE interface.

Referring now to the drawings, FIG. 1 depicts a block diagram of a system 100 to facilitate powering down of PoE interfaces, in some examples. System 100 includes a network device 110. In addition, system 100 includes a network 102 and a plurality of PDs 150 coupled to network device 110.

Network device 110 includes at least one processing resource 111 and at least one machine-readable storage medium 112 including (e.g., encoded with) set reserved power value instructions 114, determine total operational power value instructions 115, determine total available power value instructions 116, and power down instructions 117. Network device 110 may include one or more managed switches that support data link layer switching (i.e., Layer 2 or L2 switching), IP layer routing (i.e., Layer 3 or L3 routing), or a combination thereof. Moreover, network device 110 may include one or more stackable or standalone type switches, modular or fixed configuration type switches, etc. It will be understood that network device 110 may include one, two, or any suitable number of switches, and may include any suitable type(s) of switch(es), now known or later developed. In addition, network device 110 may engage in any network data transmission operations, including, but not limited to, switching, routing, bridging, or a combination thereof.

In FIG. 1, network device 110 may operate as a PSE for PDs 150. Network device 110 may be configured (e.g., encoded with instructions executable by at least one processing resource 111) to receive network request(s) 104 from a network 102 via network path(s) 106 to establish or terminate PoE power and data transmissions with one or more PDs 150. Network path(s) 106 may include any suitable link(s) 108 (e.g., wired or wireless, direct or indirect, etc.) between network device 110 and network 102. Network request(s) 104 may include any suitable instructions to instruct network device 110 to establish or terminate PoE power and data transmissions with one or more PDs 150. For instance, network request(s) 104 may include instructions to instruct network device 110 to execute one or more of set reserved power value instructions 114, determine total operational power value instructions 115, determine total available power value instructions 116, and power down instructions 117.

Network 102 may include one or more local area networks (LANs), virtual LANs (VLANs), wireless local area networks (WLANs), virtual private networks (VPNs), wide area networks (WANs), the Internet, or the like, or a combination thereof. As used herein, a "wide area network" or "WAN" may include, for example, a wired WAN, wireless WAN, hybrid WAN, software-defined WAN (SD-WAN), or a combination thereof. Moreover, in some examples, network 102 may include one or more cellular networks using one or more mobile communications standards (e.g., 4G, 5G, etc.). Moreover, although FIG. 1 shows a single network device 110 connected to network 102, it will be understood that any suitable number(s) of network devices (in addition to network device 110) may be connected to network 102.

In FIG. 1, PDs 150 may include any suitable type(s) of devices that may receive PoE from network device 110. For instance, PDs 150 may include one or more VoIP phones, LED lights, IP cameras, wireless APs, or BLE beacons, or a combination thereof. It will be understood that system 100 may include any suitable number of PDs 150. Moreover, it will be understood that PDs 150 may receive PoE power and data transmissions in conformity with any suitable type(s) of industry Ethernet standards as described herein.

In addition, network device 110 may be connected to one or more networks and may gather network operating information from various nodes of one or more networks, including network traffic load information, network topology information, network usage information, etc. Furthermore, network device 110 may transmit commands to various nodes of the one or more networks to alter network topology and routing to achieve various network efficiency and efficacy goals. It will be understood that network device 110 may include any suitable type(s) of computing device(s) to establish or terminate PoE power and data transmissions via one or more PoE interfaces. Moreover, network device 110 may include any necessary hardware components to perform the functionalities disclosed herein, including, but not limited to: processors, memories, display devices, input devices, communications equipment, etc.

In the examples described herein, a "network path" may include a combination of hardware (e.g., interfaces, links, etc.) and instructions (e.g., executable by a processing resource) to communicate (e.g., receive, send) a command (e.g., network request(s) 104) to an external resource (e.g., server, cloud computing resource, etc.) connected to the network 102.

In FIG. 1, network device 110 may be coupled to a plurality of power supply units (PSUs). Network device 110 may include a chassis that includes PSUs 120. Moreover, PSUs 120 may be fixed in the chassis of network device 110, or alternatively, PSUs 120 may be removably attached in the chassis of network device 110. Although FIG. 1 shows that PSUs 120 are included in network device 110, it will be understood that PSUs 120 may be external to network device 110, in some examples.

Two or more of PSUs 120 may have different power output capacities (e.g., one PSU may have a power output capacity of 2 kilowatts, and another PSU may have a power output capacity of 3 kilowatts). It will be understood that network device 110 may be coupled to two, four, or any suitable number of PSUs. Network device 110 may include one or more redundant PSUs, wherein the one or more redundant PSUs may provide backup power when one or more other PSUs of network device 110 experience a fault (e.g., from a power fault event). Moreover, each of PSUs 120 may be configured to continue to provide rated power for a period of time after losing power from the input power source. For instance, each of PSUs 120 may be configured to provide rated power for at least a period of time necessary for processing resource 111 to execute one or more of set reserved power value instructions 114, determine total operational power value instructions 115, determine total available power value instructions 116, and power down instructions 117.

In FIG. 1, network device 110 may be coupled to a plurality of PoE interfaces 140. Network device 110 may operate as a PSE to provide PoE to PD(s) 150 coupled to PoE interfaces 140 via PoE interfaces 140. Each of PoE interfaces 140 may receive power from one or more of PSUs 120. Further, each of PoE interfaces 140 may include an Ethernet connection (e.g., Ethernet port). The Ethernet port may include any suitable physical interface circuitry and/or media-dependent interface to provide PoE to a PD 150 coupled to the Ethernet port. Network device 110 may include a chassis that includes PoE interfaces 140 in the chassis. Moreover, PoE interfaces 140 may be fixed in the chassis of network device 110. Alternatively, PoE interfaces 140 may be removably attached in the chassis of network device 110. For instance, PoE interfaces 140 may be coupled to one or more line cards, wherein the one or more line cards are coupled to network device 110. The one or more line cards may be fixed in the chassis of network device 110, or alternatively, the one or more line cards may be removably attached in the chassis of network device 110. It will be understood that network device 110 may be coupled to any suitable number of PoE interfaces, and any suitable number of line cards that are each coupled to any suitable number of PoE interfaces. It will be understood that network device 110 and PoE interfaces 140 may provide PoE power and data transmissions in conformity with any suitable type(s) of industry Ethernet standards, now known or later developed. For instance, network device 110 and PoE interfaces 140 may provide PoE power and data transmissions in conformity with one or more of IEEE 802.3af, IEEE 802.3at, IEEE 802.3bt, and LTPoE++.

In FIG. 1, network device 110 may include one or more support components 130. Support component(s) 130 of network device 110 may help in connecting and/or providing support to various elements of network device 110 for proper functioning. Examples of support component(s) 130 may include fabric(s), backplane(s), line card(s), management module(s), display card(s), fan(s), or the like. Network device 110 may include a chassis that includes support component(s) 130 in the chassis. In some examples, support component(s) 130 may be removably attached to the chassis of network device 110. Each support component(s) 130 may receive an input power via an input power source (e.g., a power distribution unit).

In the example of FIG. 1, network device 110 may be configured (e.g., encoded with instructions executable by at least one processing resource 111) to provide power, from PSUs 120, to POE interfaces 140 and support component(s) 130. In some examples, each of PoE interfaces 140 and support component(s) 130 may receive an input power from PSUs 120 via an input power source (e.g., a power distribution unit).

Network device 110 may be configured (e.g., encoded with instructions executable by at least one processing resource 111) to send or receive data/power signal(s) 170 via data/power path(s) 160 to establish or terminate PoE power and data transmissions with one or more PDs 150. Data/power path(s) 160 may include any suitable link(s) 162 between network device 110 and one or more PDs 150. For instance, link(s) 162 may include one or more Ethernet cables. Data/power signal(s) 170 may include any suitable instructions for network device 110 to establish or terminate PoE power and data transmissions with one or more PDs 150 (e.g., for network device 110 to perform one or more of set reserved power value instructions 114, determine total operational power value instructions 115, determine total available power value instructions 116, and power down instructions 117).

In the examples described herein, a "data/power path" may include a combination of hardware (e.g., interfaces, links, etc.) and instructions (e.g., executable by a processing resource) to communicate (e.g., receive, send) a command (e.g., data/power signal(s) 170) with one or more PDs 150.

Network device 110 may perform several functionalities for powering down one or more of PoE interfaces 140. The functionalities performed by network device 110 may be performed by processing resource 111 executing set reserved power value instructions 114, determine total operational power value instructions 115, determine total available power value instructions 116, and power down instructions 117 stored in machine-readable storage medium 112 (e.g., a non-transitory machine-readable storage medium). The functionalities performed by network device 110 for powering down one or more of PoE interfaces 140 are described herein with the help of a flowchart of FIG. 2 below. Although not shown, in some examples, network device 110 may be encoded with certain additional executable instructions to perform actions as described herein, without limiting the scope of the present disclosure.

Figure 2:
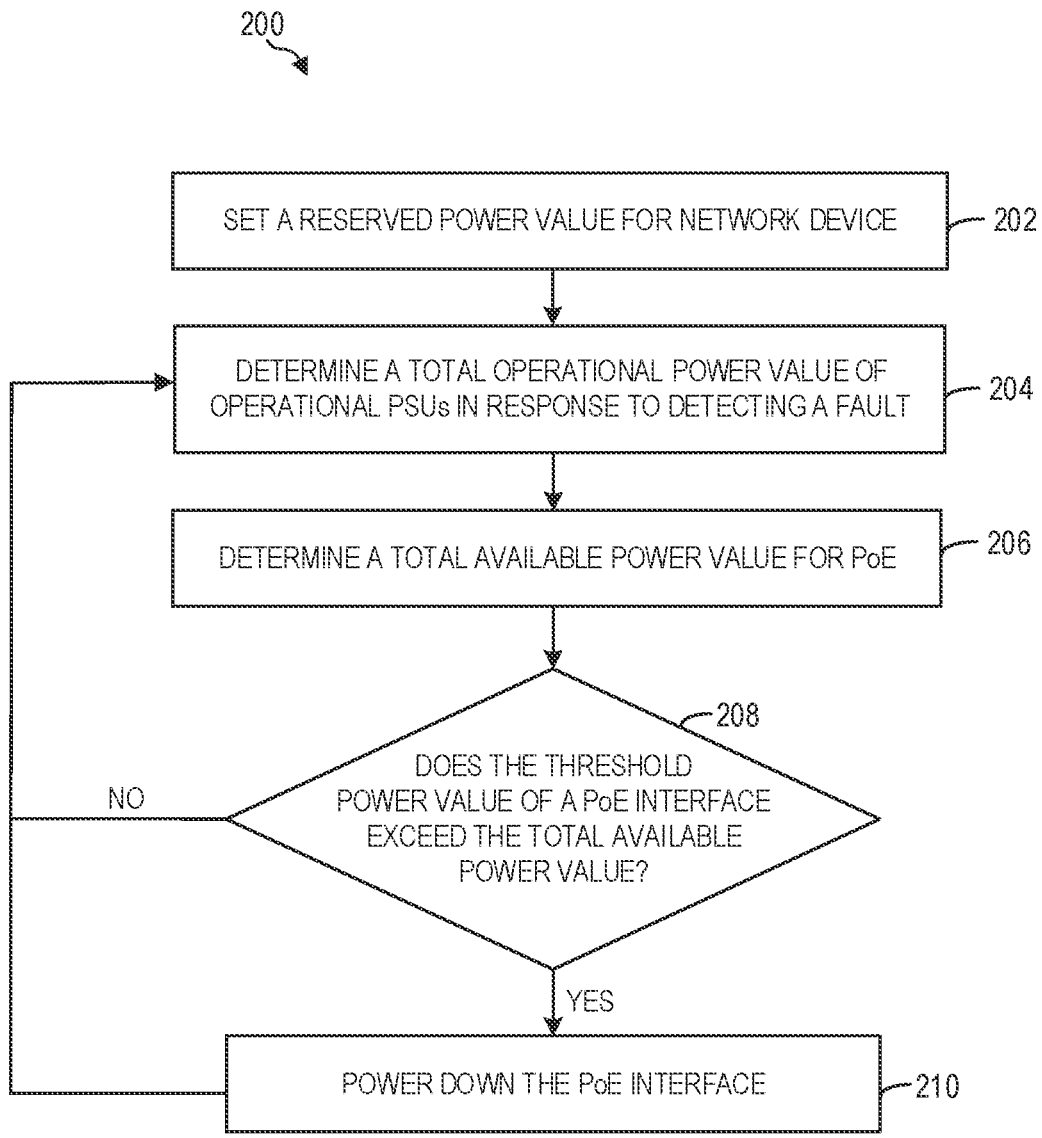
FIG. 2 is a flowchart of a method for powering down PoE interfaces, in accordance with an example.

Referring to FIG. 2, a flowchart depicting a method 200 for powering down PoE interfaces is presented in some examples. Although the execution of method 200 is described below with reference to network device 110 of FIG. 1, any suitable PSE device(s) for the execution of method 200 may be utilized. Additionally, the implementation of method 200 is not limited to such examples. While method blocks 202-216 are shown in method 200, method 200 may include other actions described herein. Additionally, although the blocks are shown in an order, blocks depicted in FIG. 2 may be performed in any suitable order and at any time. Also, some of the blocks shown in method 200 may be omitted without departing from the spirit and scope of this disclosure.

At block 202, method 200 may include setting a reserved power value for network device 110. In some examples, set reserved power value instructions 114, when executed by processing resource 111, set the reserved power value for network device 110. The reserved power value for network device 110 may represent a predetermined amount of power that is reserved for providing power to support component(s) 130 of network device 110 relative to a total power capacity of all PSUs 120. In certain examples, the reserved power value for network device 110 may represent a maximum amount of power that can be provided to support component(s) 130 relative to the total power capacity of all PSUs 120. The maximum amount of power that can be provided to support component(s) 130 may be an aggregate of a maximum power requirement for each of support component(s) 130. Setting the reserved power value for network device 110 may include assigning an unsigned bit value for support component(s) 130 of network device 110. Each bit of the reserved power value may correspond to an amount of power that can be provided to support component(s) 130 of network device 110. For instance, an 8-bit unsigned bit value between 0 and 255 may be assigned as the reserved power value for network device 110. In some instances, if a total power capacity of PSUs 120 is 10 kilowatt and a maximum amount of power for support component(s) is 200 watts, a reserved power value is an 8-bit unsigned bit value of 5. It will be understood that the reserved power value for network device 110 can be an 8-bit unsigned value, 9-bit unsigned value, 16-bit unsigned value, or any suitable size bit value, and may also include any suitable format(s) (e.g., unsigned bit value, signed bit value). The reserved power value for network device 110 may be predetermined by network device 110 or received as an input by network device 110 (e.g., from the network 102 via network request 104).

In some examples, method 200 may include setting a threshold power value for each of PoE interfaces 140. In some examples, machine-readable storage medium 112 may include threshold power values instructions which, when executed by processing resource 111, set the threshold power value for each of PoE interfaces 140. A threshold power value for a PoE interface of PoE interfaces 140 may represent a threshold (i.e., minimum) amount of power that is provided to the PoE interface, in form of PoE power and data transmissions, based on the power required for one or more of PDs 150 coupled to that PoE interface. In some examples, the threshold amount of power that is provided to the PoE interface may further depend on a priority level for providing power to that PoE interface relative to the other PoE interfaces of PoE interfaces 140. In some examples, a PoE interface of PoE interfaces 140 that receives a threshold amount of power (e.g., 30 watts) lower than a threshold amount of power (e.g., 60 watts) received by another PoE interface of PoE interfaces 140 may be configured to have a higher priority level for receiving power as compared to the other PoE interface. The priority level for providing power to a PoE interface of PoE interfaces 140 relative to the other PoE interfaces of PoE interfaces 140 may be predetermined by network device 110 or received as an input by network device 110 (e.g., from one or more networks via network request(s) 104).

Setting the threshold power value for each of PoE interfaces 140 may include assigning an unsigned bit value for the PoE interface 140. For instance, an 8-bit unsigned bit value between 0 and 255 may be assigned as the threshold power value for each of PoE interfaces 140. Each bit of the threshold power value for a given PoE interface of PoE interfaces 140 may correspond to a threshold amount (i.e., minimum amount) of power provided to the given PoE interface based on the power required for one or more of PDs 150 coupled to the given PoE interface and a priority level for providing power to the given PoE interface. For instance, when a first PoE interface of PoE interfaces 140 receives 1000 watts and is configured to have a high priority level for receiving power, and a second PoE interface of PoE interfaces 140 receives 1000 watts and is configured to have a low priority level, the first PoE interface may be assigned a threshold power value of 25 and the second PoE interface may be assigned a threshold power value of 50. It will be understood that the threshold power value for each of PoE interfaces 140 can be an 8-bit unsigned value, 9-bit unsigned value, 16-bit unsigned value, or any suitable size bit value, and may also include any suitable format(s) (e.g., unsigned bit value, signed bit value). The threshold power value for a given PoE interface of PoE interfaces 140 may be predetermined by network device 110 or received as an input by network device 110 (e.g., from the network 102 via network request(s) 104).

At block 204, method 200 may include determining a total operational power value of PSUs 120 in response to detecting a fault that interrupts a flow of power from PSUs 120 to one or more of PoE interfaces 140. In some examples, determine total operational power value instructions 115, when executed by processing resource 111, may determine the total operational power value of PSUs 120 in response to detecting the fault. The fault may occur in one or more of PSUs 120 that causes a loss of power that can be provided by PSUs 120. A given PSU may be identified to be faulted when a power output capacity of the given PSU is zero (e.g., a complete power fault) or less than a predetermined power output capacity of the given PSU (e.g., a partial power fault). In some examples, the fault may be detected in one of PSUs 120, which may be referred to herein as a 'faulted PSU.' The total operational power value of PSUs 120 may be determined based on operational power values of all operational (non-faulted) PSUs among PSUs 120. As used herein, an operational PSU may refer to a PSU that provides a power output capacity. The operational PSUs among PSUs 120 may be referred to herein as 'operational PSUs 120.' An operational power value of an operational PSU may represent a ratio of a power output capacity of the operational PSU to a total power output capacity of all operational PSUs 120. Setting the operational power value of each of operational PSUs 120 may include assigning an unsigned bit value to the operational PSU. For instance, an 8-bit unsigned value between 0 and 255 may be assigned as an operational power value of a given operational PSU. In some examples, when network device 110 is coupled to two operational PSUs 120 each having the same power output capacity (e.g., 1 kilowatts), each of two operational PSUs 120 may be assigned an 8-bit unsigned value of 127 as the operational power value, to represent that the power output capacity of each of two operational PSUs 120 is half of the total power output capacity of two operational PSUs 120 (represented as the 8-bit unsigned value of 255). Each bit of the operational power value may correspond to an amount of power that can be provided to one or more of PoE interfaces 140 coupled to network device 110 and support component(s) 130 of network device 110. For instance, when network device 110 receives power from operational PSUs 120 having a total power output capacity of 10 kilowatts, and when the operational power value is represented as an 8-bit unsigned value (i.e., a value representing 255 levels), each level of the operational power value may correspond to 39.215 (i.e., 10 kilowatts/255) watts of power that can be provided to support component(s) 130 and one or more of PoE interfaces 140 by network device 110. In some examples, the operational power value of a given PSU in PSUs 120 indicates an amount of power that is lost when the given PSU faults. Alternatively, an operational power value of a PSU may correspond to a null power value (e.g., an unsigned 8-bit value of 0), such that the operational power value represents that the given PSU has no power output capacity when it is faulted.

At block 204, method 200 may include summing up operational power values for all operational PSUs 120 to determine the total operational power value. In some examples, determine total operational power value instructions 115 may include instructions to, sum up the operational power values for all operational PSUs 120 to determine the total operational power value. Summing up the operational power values for all operational PSUs 120 may be performed via an adder circuit. For instance, determine total operational power value instructions 115 may comprise instructions to receive, by the adder circuit, the operational power values for all operational PSUs 120 as input values, and sum-up, by the adder circuit, the received operational power values to determine the total operational power value. The adder circuit for computing the total operational power value may include multiple adders (e.g., multiple levels of adders). Summing up the operational power values for all operational PSUs 120 may be performed synchronously or asynchronously. For instance, the operational power values for all operational PSUs 120 can be summed up simultaneously via the adder circuit. In other instances, the operational power values of two or more of operational PSUs 120 can be summed up to determine an intermediate operational power value, and then the operational power value of each of other operational PSUs 120 can be added to the intermediate operational power value to determine the total operational power value. In some examples where the operational power value of a faulted PSU is null, determine total operational power value instructions 115 may include instructions to, sum up the operational power values of all PSUs 120 to determine the total operational power value. It will be understood that the adder circuit may include one, three, or any suitable number of adders and that the adder circuit may include one or more half adders, full adders, ripple-carry adders, carry-lookahead adders, carry-save adders, or any suitable type(s) of adders. It will be understood that the adder circuit may be integrated into one or more devices (e.g., chips) as an integrated circuit and/or any other suitable hardware.

At block 206, method 200 may include determining a total available power value based on the total operational power value and the reserved power value. The total available power value may represent a total available power for PoE (i.e., a total available power for PoE interfaces 140). In some examples, determine total available power value instructions 116, when executed by processing resource 111, may determine the total available power value. The total available power for PoE may represent an amount of power that is available to be provided to PoE interfaces 140 based on a total amount of power received from operational PSUs 120. In certain examples, the available amount of power to be provided to PoE interfaces 140 may depend on the total amount of power received from operational PSUs 120 by taking into account a power loss due to the fault (as detected in block 204) and the reserved amount of power that can be used to provide power to support component(s) 130 of network device 110. At block 206, determining the total available power value may include subtracting the reserved power value for network device 110 from the total operational power value. Subtracting the reserved power value from the total operational power value may be performed via a subtractor circuit. For instance, determine total available power value instructions 116 may comprise instructions to receive, by the subtractor circuit, the total operational power value as an input value, and subtract, by the subtractor circuit, the reserved power value from the total operational power value. It will be understood that the subtractor circuit may include one or more half subtractors, full subtractors, or any suitable type(s) of subtractors. It will be understood that the subtractor circuit may be integrated into one or more devices (e.g., chips) as an integrated circuit and/or any other suitable hardware.

At block 206, method 200 may further include sending the total available power value to each of PoE interfaces 140. Sending the total available power value to each of PoE interfaces 140 may be performed via a subtractor circuit (e.g., as described above) as an output value of the subtractor circuit. Moreover, sending the total available power value to each of PoE interfaces 140 may be performed synchronously or asynchronously with sending the total available power value to the other PoE interfaces 140. For instance, the total available power value can be sent asynchronously (e.g., independently and in parallel and/or simultaneously) to each of PoE interfaces 140.

At block 208, method 200 may perform a check to determine whether the threshold power value for each of PoE interfaces 140 exceeds the total available power value. In some examples, power down instructions 117, when executed by processing resource 111, determine whether the threshold power value for each of PoE interfaces 140 exceeds the total available power value. Determining whether the threshold power value for each of PoE interfaces 140 exceeds the total available power value may be performed synchronously or asynchronously with the other PoE interfaces 140. For instance, determining whether the threshold power value for each of PoE interfaces 140 exceeds the total available power value may be performed asynchronously (e.g., independently and in parallel and/or simultaneously). At block 208, if it is determined that the threshold power value for a given PoE interface 140 exceeds the total available power value, then method 200 proceeds to block 210. At block 208, if it is determined that the threshold power value for the given PoE interface 140 does not exceed the total available power value, then method 200 may return to block 204.

At block 206, determining whether the threshold power value for each of PoE interfaces 140 exceeds the total available power value may be performed, individually, via a comparator circuit. In some examples, each of PoE interfaces 140 may include a separate comparator circuit that determines whether the threshold power value for the PoE interface exceeds the total available power value. For instance, power down instructions 117 may comprise instructions to receive, by each comparator circuit, the total available power value as a first input value, receive the threshold power value for the corresponding PoE interface 140 as a second input value, and compare the total available power value with the threshold power value for the PoE interface 140. Moreover, power down instructions 117 may comprise instructions to send, by each comparator circuit, an output value that indicates whether the threshold power value for the corresponding PoE interface exceeds the total available power value. For instance, each comparator circuit may send a high output voltage value to indicate that the threshold power value for the corresponding PoE interface exceeds the total available power value. Alternatively, the comparator circuit may send a low output voltage value to indicate that the threshold power value for the corresponding PoE interface exceeds the total available power value. Each comparator circuit may receive the total available power value from a subtractor circuit (as described above). It will be understood that each comparator circuit may be integrated into one or more devices (e.g., chips) as an integrated circuit and/or any other suitable hardware.

At block 210, method 200 may include, powering down one or more of PoE interfaces 140 for which it is determined (at block 208) that the threshold power value exceeds the total available power value. In some examples, power down instructions 117, when executed by processing resource 111, power down one or more of PoE interfaces 140 for which it is determined (at block 208) that the threshold power value exceeds the total available power value. Each of PoE interfaces 140 for which it is determined (at block 208) that the corresponding threshold power value exceeds the total available power value may be powered down synchronously or asynchronously with one or more of the other PoE interfaces 140 for which it is determined (at block 208) that the respective threshold power values, individually, exceed the total available power value. For instance, each of PoE interfaces 140 for which it is determined that the corresponding threshold power value exceeds the total available power value may be powered down asynchronously (e.g., independently and in parallel and/or simultaneously) with all other such PoE interfaces.

For instance, when a reserved power value of network device 110 is assigned a value of 5 and a total operational power value is determined to be a value 100, a total available power value is determined to be 95 (i.e., 100-5). In such instance, if a threshold power value for a given PoE interface is assigned a value of 100, it is determined that the threshold power value for the given PoE interface exceeds the total available power value (i.e., 100>95) and thereby the network device 110 powers down the given PoE interface. Moreover, in another instance, if a total operational power value is determined to be a value 200, a total available power value is determined to be 195 (i.e., 200-5). In such instance, it is determined that the threshold power value for the given PoE interface does not exceed the total available power value (i.e., 100<195) and thereby the network device 110 continues to provide power to the given PoE interface.

At block 210, power down instructions 117 (as described above) may be implemented using hardware (e.g., a comparator circuit) at each of PoE interfaces 140, such that software-based communication between a PSU management system and a PoE management system on failsafe power is not required to power down the PoE interface.

In FIG. 2, method 200 may return to block 204 after powering down one or more of PoE interfaces 140 at block 210 to account for power loss due to the occurrence of any subsequent fault in another PSU of PSUs 120.

In this manner, the examples described herein provide improved power down of PoE interfaces. For instance, network device 110 may determine the total available power value (at block 206) by subtracting the reserved power value for network device 110 from the total operational power value of operational PSUs 120, thereby providing an accurate and efficient determination of an amount of power provided to PoE interfaces 140 by taking into account power loss due to one or more faulted PSU in PSUs 120 and an amount of power that can be provided to support component(s) 130 of network device 110. Furthermore, network device 110 may determine any of PoE interfaces 140 for which the threshold power value exceeds the total available power value (at block 208), and power down the PoE interface (at block 216), thereby providing efficient power down of only a number of PoE interfaces that prevent an aggregate power load (e.g., a total power load of PDs 150 and network device 110) from exceeding the power output capacity of operational (i.e., non-faulted) PSU(s) 120. In addition, network device 110 may include hardware that is configured to determine whether the threshold power value for the given PoE interface 140 exceeds the total available power value (at block 208) and power down the given PoE interface 140(at block 216), thus mitigating the need for software-based communications between a PSU management system and a PoE management system on failsafe power to power down PoE interfaces and thereby reducing latency. In addition, network device 110 determines the total available power value by subtracting the reserved power value from the total operational power value, thereby mitigating the need for adjusting a threshold power value for each of PoE interfaces 140 with a change in an amount of power that is provided to support component(s) 130 of network device 110.

Figure 3:
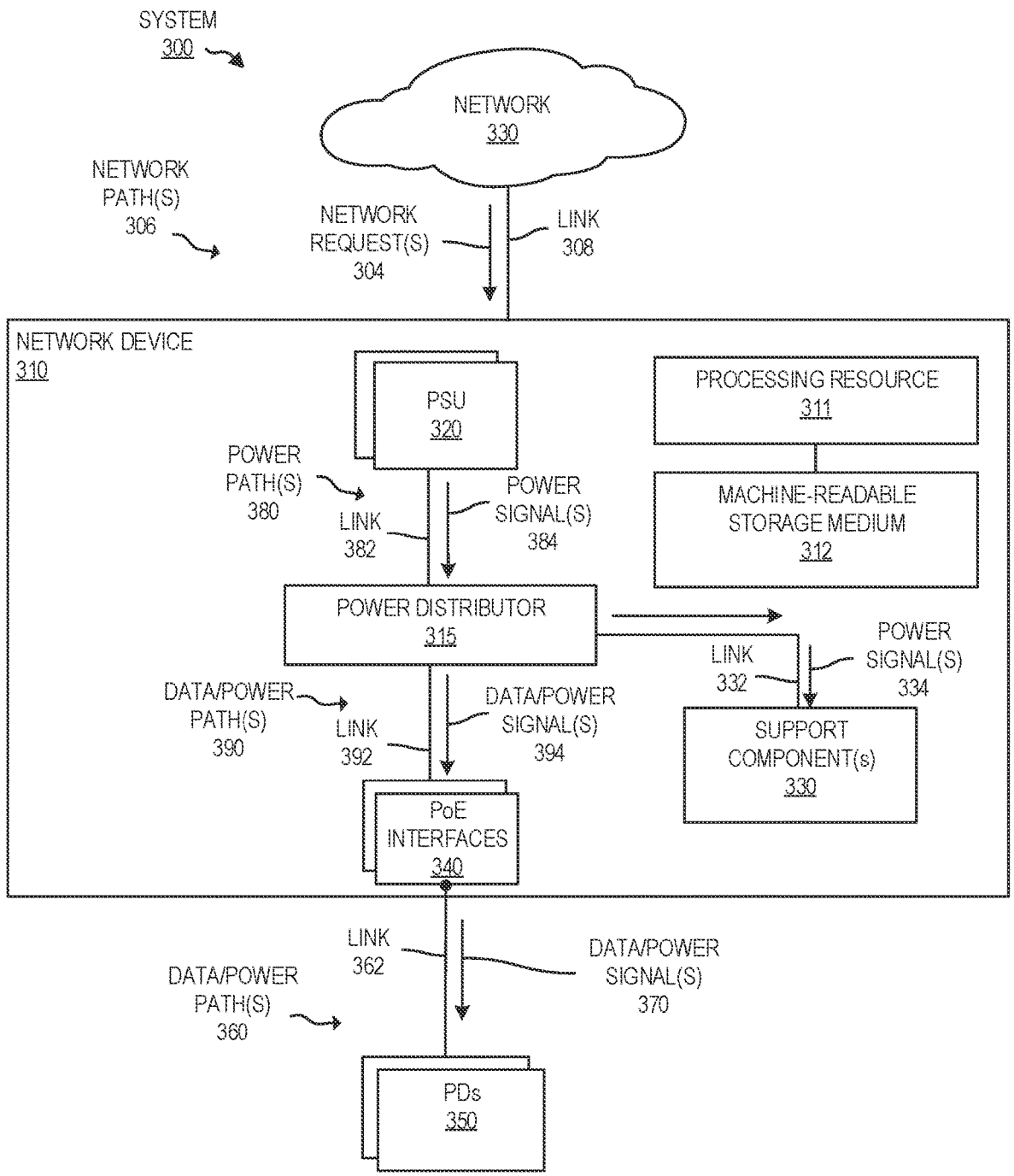
FIG. 3 is a block diagram of a system for powering down PoE interfaces, in accordance with an example.

Turning to FIG. 3, FIG. 3 depicts a block diagram of a system 300 for powering down of PoE interfaces, in some examples. System 300 depicted in FIG. 3 may be representative of one example of system 100 depicted in FIG. 1. Accordingly, system 300 may include certain features that are similar, in one or more aspects (e.g., geometry, dimension, positioning, material properties, or operation), with similarly named features of system 100, description of which is not repeated herein for the sake of brevity. For example, system 300 may include a network device 310 coupled to a network 302 and a plurality of PDs 350. Network device 310 may operate as a PSE for PDs 350. Network device 110 may be configured to receive network request(s) 304 from network 302 via network path(s) 306 (e.g., via link(s) 308) to establish or terminate PoE power and data transmissions with one or more of PDs 350. Network device 310 may be configured to send or receive data/power signal(s) 370 via data/power path(s) 360 (e.g., via link(s) 362) to establish or terminate PoE power and data transmissions with one or more of PDs 350. Network device 310 may include a plurality of PSUs 320, one or more support components 330, and a plurality of PoE interfaces 340. Further, network device 310 may include at least one processing resource 311 and at least one machine-readable storage medium 312 including (e.g., encoded with) set reserved power value instructions 114, determine total operational power value instructions 115, determine total available power value instructions 116, and power down instructions 117.

As compared to system 100 of FIG. 1, network device 310, in the example FIG. 3, may include a power distributor 315 which is coupled between PSUs 320 and PoE interfaces 340 to provide power from PSUs 320 to PoE interfaces 340. In some examples where PSUs 320 are external to network device 310, power distributor 315 may be implemented external to network device 310. Power distributor 315 may be configured (e.g., encoded with instructions executable by the at least one processing resource 311) to receive power signal(s) 384 from one or more of PSUs 320 via power path(s) 380. Power path(s) 380 may include any suitable link(s) 382 between PSUs 320 and power distributor 315. Moreover, power distributor 315 may be configured (e.g., encoded with instructions executable by the at least one processing resource) to send or receive data/power signal(s) 394 to one or more PoE interfaces 340 via data/power path(s) 390. Data/power path(s) 390 may include any suitable link(s) 392 between power distributor 315 and PoE interfaces 340.

Power distributor 315 may include a midplane that is configured to provide power to support components 130 (e.g., fabric(s), backplane(s), line card(s), management module(s), display card(s), etc.) of network device 310. Power distributor 315 may include one or more power boards that couple one or more of PSUs 320 to a backplane of network device 310, to provide power to support component(s) 130 of network device 310. Power distributor 315 may be configured (e.g., encoded with instructions executable by the at least one processing resource 311) to send or receive power signal(s) 334 to support components 330 via any suitable link(s) 332. In some instances, network device 310 may provide power to PoE interfaces 340 and the support component(s) without a power distributor 315.

Figure 4:
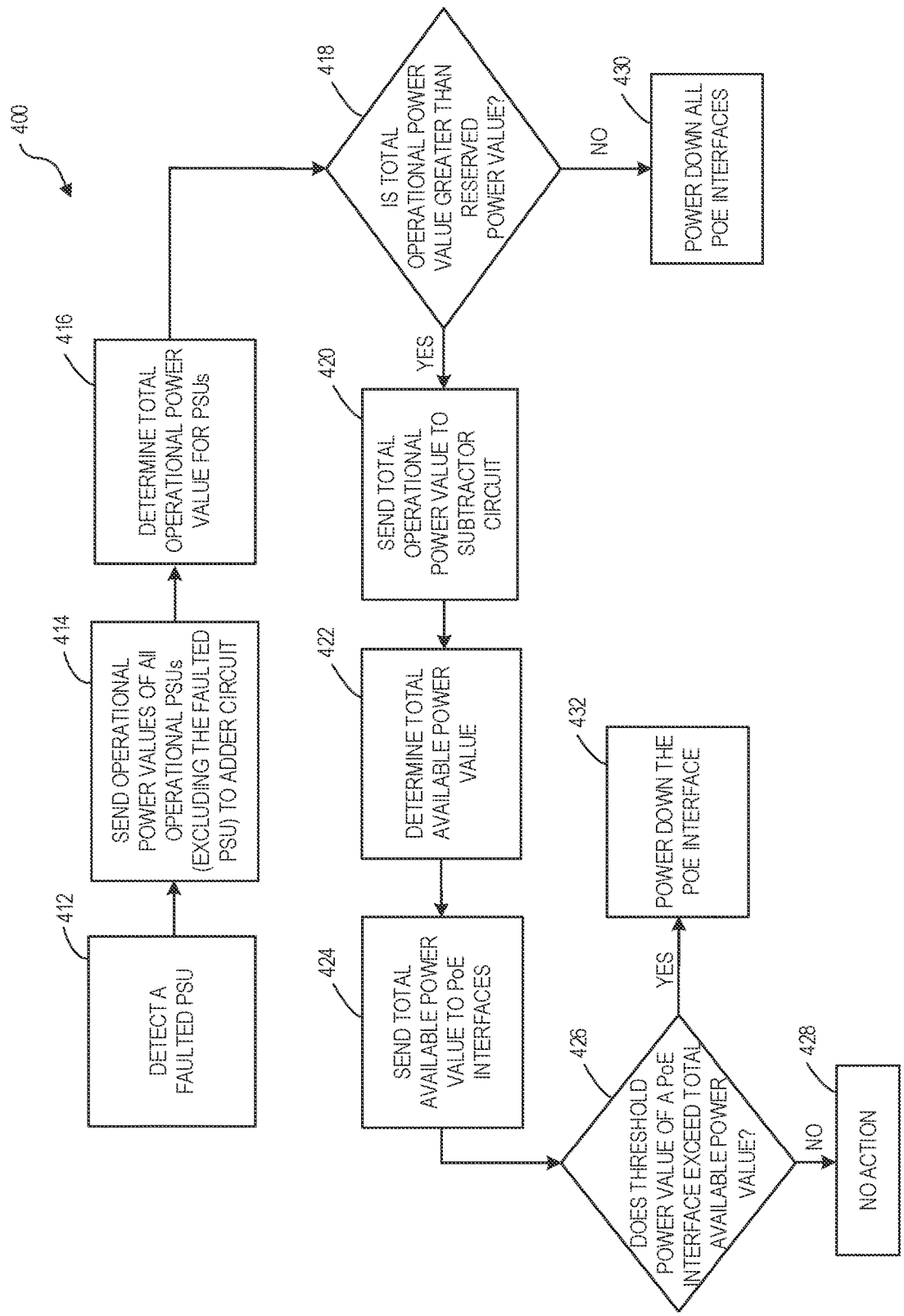
FIG. 4 is a flowchart of a method for powering down PoE interfaces, in accordance with another example.

FIG. 4 is a flowchart of a method 400 for providing a total available power value to each of a plurality of PoE interfaces by a network device (e.g., network device 110, network device 310) and powering down one or more of the PoE interfaces, in some examples. Although execution of method 400 is described below with reference to network device 110 of FIG. 1, other network devices suitable for the execution of method 400 may be utilized. Additionally, the implementation of method 400 is not limited to such examples. Moreover, one or more blocks of method 400 may be performed in combination with one or more blocks of method 200. While only twelve blocks are shown in method 400, method 400 may include other actions described herein. Additionally, although the blocks are shown in an order, blocks depicted in FIG. 4 may be performed in any suitable order and at any time. Also, some of the blocks shown in method 400 may be omitted without departing from the spirit and scope of this disclosure.

Referring to FIG. 4, at block 412, network device 110 may detect a faulted PSU in PSUs 120. The faulted PSU may provide no power output capacity. It will be understood that method 400 may include additional steps to identify whether any other PSU among PSUs 120 has faulted. Identifying that a PSU has faulted may be performed synchronously or asynchronously while determining whether any other PSU among PSUs 120 has faulted.

At block 414, in response to detecting the fault, network device 110 may send the operational power values for all the operational (i.e., non-faulted) PSUs (excluding the faulted PSU) among PSUs 120 to an adder circuit. Sending the operational power values for operational PSUs 120 to the adder circuit may include performing one or more steps of block 204 as described above in relation to method 200 of FIG. 2.

Further, at block 414, sending the operational power value of each operational PSU 120 to the adder circuit may be performed synchronously or asynchronously with sending the operational power value(s) for one or more of the other operational PSUs 120. For instance, the operational power value of a first operational PSU among PSUs 120 may be sent to the adder circuit while sending the operational power value of a second operational PSU among PSUs 120.

At block 416, network device 110 may determine a total operational power value based on the operational power values of all operational PSUs 120 by the adder circuit. Determining the total operational power value may include performing one or more steps of block 204 as described above in relation to method 200 of FIG. 2. For instance, at block 416, network device 110 may include instructions to sum up, by the adder circuit, the received operational power values of all operational PSUs 120 to provide the total operational power value.

At block 418, network device 110 may perform a check to determine whether the total operational power value is greater than a reserved power value (described previously) of network device 110. At block 418, if it is determined that the total operational power value is greater than the reserved power value, method 400 may proceed to block 420. At block 418, if it is determined that the total operational power value is not greater than the reserved power value, network device 110 may power down all PoE interfaces 140. Powering down all PoE interfaces 140 may be performed synchronously or asynchronously.

At block 420, network device 110 may send the total operational power value to a subtractor circuit. Sending the total operational power value as an output value of the adder circuit to an input value of the subtractor circuit may include one or more steps of block 206 as described above in relation to method 200 of FIG. 2. Moreover, network device 110 may send the reserved power value for network device 110 to the subtractor circuit along with the total operational power value.

At block 422, network device 310 may determine, by the subtractor circuit, a total available power value based on the total operational power value and the reserved power value. Determining the total available power value may include one or more steps of block 206 as described above in relation to method 200 of FIG. 2. For instance, at block 422, network device 310 may include instructions to subtract, by the subtractor circuit, the reserved power value from the total operational power value to provide the total available power value.

At block 424, network device 310 may send the total available power value to each of PoE interfaces 140. Sending the total available power value to each of PoE interfaces 140 may include one or more steps of block 206 as described above in relation to method 200 of FIG. 2. For instance, sending the total available power value to each of PoE interfaces 140 may be performed via the subtractor circuit. Moreover, sending the total available power value to each of PoE interfaces 140 may be performed synchronously or asynchronously.

At block 426, network device 110 may perform a check to determine, for each of PoE interfaces 140, whether a corresponding threshold power value (described previously) exceeds the total available power value. Determining whether the threshold power value for each PoE interface 340, individually, exceeds the total available power value may include one or more steps of block 208 as described above in relation to method 200 of FIG. 2. Determining whether the threshold power value for each PoE interface 140 exceeds the total available power value may be performed synchronously or asynchronously. In some examples, each PoE interface 140 may include a comparator circuit, and determining whether the corresponding threshold power value exceeds the total available power value may be performed, individually, via the corresponding comparator circuit. At block 426, for each PoE interface among PoE interfaces 340 for which it is determined that the corresponding threshold power value does not exceed the total available power value, network device 110 may not perform any action as shown in block 428. At block 426, each PoE interface among PoE interfaces 340 for which it is determined that the corresponding threshold power value exceeds the total available power value, network device 110 may power down the PoE interface synchronously or asynchronously.

Figure 5:
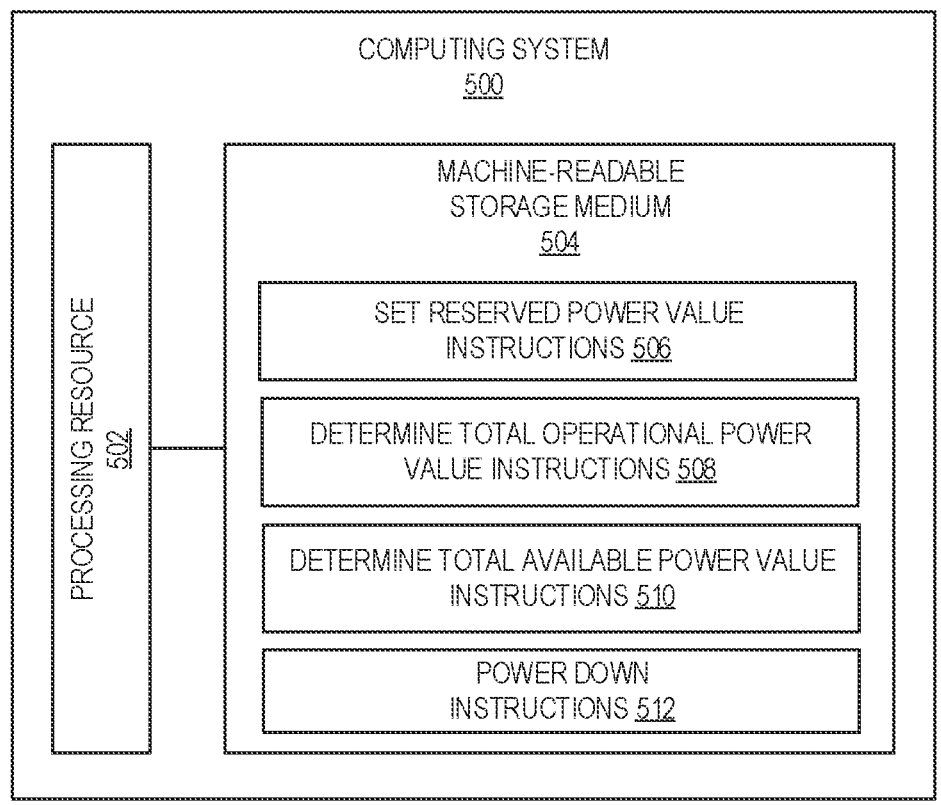
FIG. 5 is a block diagram of a computer system in which various examples described herein may be implemented for powering down PoE interfaces, in accordance with an example.

FIG. 5 is a block diagram of a computing system 500 including a processing resource 502 and a machine-readable storage medium 504 encoded with example instructions to power down PoE interfaces of a network device (e.g., network device 110 of FIG. 1, network device 310 of FIG. 3), in some examples. As described in detail herein, machine-readable storage medium 504 may be encoded with executable instructions set reserved power value instructions 506, determine total operational power value instructions 508, determine total available power value instructions 510 and power down instructions 512 (hereinafter collectively referred to as instructions 506-512) for performing one or more of method blocks of flowchart 200 of FIG. 2 and/or flowchart 400 of FIG. 4. Although not shown, in some examples, machine-readable storage medium 504 may be encoded with certain additional executable instructions to perform one or more of method blocks of flowcharts 200 and 400, and/or any other operations performed by network device 110, without limiting the scope of the present disclosure.

Machine-readable storage medium 504 may be non-transitory and is alternatively referred to as a non-transitory machine-readable storage medium 504. In some examples, machine-readable storage medium 504 may be accessed by processing resource 502. In some examples, computing system 500 may be included in (e.g., as part of) a network device (e.g., network device 110 of FIG. 1, network device 310 of FIG. 3). In some examples, processing resource 502 may represent one example of processing resource 111 of network device 110. Further, machine-readable storage medium 504 may represent one example of machine-readable storage medium 112 of network device 110. In some examples, processing resource 502 may fetch, decode, and execute instructions 506-512 stored in machine-readable storage medium 504 to power down one or more of PoE interfaces 140 of network device 110.

Set reserved power value instructions 506, when executed by processing resource 502, may set a reserved power value for network device 110. Further, determine total operational power value instructions 508, when executed by processing resource 502, may determine a total operational power value in response to detecting a fault that interrupts a flow of power from PSUs 120 to one or more of PoE interfaces 140. Determine total available power value instructions 510, when executed by processing resource 502, may determine a total available power value based on the total operational power value and the reserved power value. Furthermore, power down instructions 512, when executed by processing resource 502, may determine, for each of PoE interfaces 140, whether a threshold power value of the PoE interface exceeds the total available power value and power down one or more of PoE interfaces 140 for which it is determined that the threshold power value exceeds the total available power value.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked based on (e.g., in response to) detected events or interrupts. Software components configured for execution on computing devices may be provided on a computer-readable medium, such as a compact disc, digital video disc, flash drive, magnetic disc, or any other tangible medium, or as a digital download (and may be originally stored on a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be composed of connected logic units, such as gates and flip-flops, and/or may be composed of programmable units, such as programmable gate arrays or processors.

In examples described herein, the term "processing resource" may include, for example, one processor or multiple processors included in a single computing system or distributed across multiple computing systems. As used herein, a "processor" may be at least one of a central processing unit (CPU), a semiconductor-based microprocessor, a graphics processing unit (GPU), a field-programmable gate array (FPGA) other hardware devices such as but not limited to integrated circuit (IC), control logic, electronic circuits, or combinations thereof that include a number of electronic components. The processing resource may fetch, decode, and execute instructions stored in a machine-readable storage medium to perform the functionalities described in relation to the instructions stored on the machine-readable storage medium.

In the examples described herein, the term "machine-readable storage medium," and similar terms, refers to any electronic, magnetic, optical, or other physical storage devices that contains or stores executable instructions. The machine-readable storage medium may be non-transitory. Common forms of non-transitory machine-readable storage medium include, for example, a floppy disk, a flexible disk, hard disk, solid-state drive, magnetic tape, or any other magnetic data storage medium, a CD-ROM, any other optical data storage medium, any physical medium with patterns of holes, a random access memory (RAM), a programmable read-only memory (PROM), and erasable programmable read-only memory (EPROM), a FLASH- EPROM, non-volatile random access memory (NVRAM), any other memory chip or cartridge, and networked versions of the same.

The non-transitory machine-readable storage medium is distinct from but may be used in conjunction with transmission media. Transmission media participates in transferring information between non-transitory media. For example, transmission media includes coaxial cables, copper wire, and fiber optics. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method, comprising:
    setting a reserved power value for a network device, wherein the network device comprises a plurality of Power Supply Units (PSUs) and a plurality of Power over Ethernet (PoE) interfaces that receive power from the plurality of PSUs;
    in response to detecting a fault that interrupts a flow of power from the plurality of PSUs to one or more of the plurality of PoE interfaces, determining, by the network device, a total operational power value based on an operational power value of each operational PSU of the plurality of PSUs;
    determining, by the network device, a total available power value based on the total operational power value and the reserved power value for the network device; and
    for each of the plurality of PoE interfaces:
        determining, by the network device, whether a threshold power value of the PoE interface exceeds the total available power value; and
        in response to determining that the threshold power value of the PoE interface exceeds the total available power value, powering down, by the network device, the PoE interface.

2. The method of claim 1, wherein the operational power value of each operational PSU of the plurality of PSUs corresponds to a ratio of a power output capacity of the operational PSU to a total power output capacity of the operational PSUs.

3. The method of claim 1, wherein the operational power value of each operational PSU comprises an unsigned bit value assigned to the operational PSU.

4. The method of claim 1, wherein the reserved power value comprises a predetermined amount of power utilized by one or more support components of the network device.

5. The method of claim 1, wherein the reserved power value comprises an unsigned bit value assigned to one or more support components of the network device.

6. The method of claim 1, wherein the threshold power value for each of the plurality of PoE interfaces comprises an unsigned bit value assigned to the PoE interface.

7. The method of claim 1, wherein determining the total operational power value comprises summing up, by adder circuitry of the network device, unsigned bit values representative of the operational power value of each operational PSU of the plurality of PSUs to determine the total operational power value.

8. The method of claim 7, wherein determining the total available power value comprises subtracting, by the network device, an unsigned bit value representative of the reserved power value from an unsigned bit value output by the adder circuitry and representative of the total operational power value.

9. The method of claim 8, further comprising sending, by the network device, an unsigned bit value representative of the total available power value to each of the plurality of PoE interfaces.

10. The method of claim 9, wherein determining, by the network device, whether the threshold power value of the PoE interface exceeds the total available power value comprises comparing, by a comparator of the network device associated with the PoE interface, the unsigned bit value representative of the total available power value with an unsigned bit value representative of the threshold power value for the PoE interface.

11. The method of claim 1, further comprising:
    determining, by the network device, whether the total operational power value exceeds the reserved power value; and
    in response to determining that the total operational power value does not exceed the reserved power value, powering down the plurality of PoE interfaces.

12. The method of claim 1, wherein the plurality of PSUs are configured to provide power to the plurality of PoE interfaces via a Power Sourcing Equipment (PSE).

13. The method of claim 1, wherein each of the plurality of PoE interfaces is coupled to a Powered Device (PD) via an Ethernet connection.

14. A network device, comprising:
    a plurality of Power over Ethernet (PoE) interfaces;
    one or more support components;
    a plurality of Power Supply Units (PSUs) that provide power to the plurality of PoE interfaces and the one or more support components;
    at least one processing resource; and
    at least one machine-readable storage medium comprising instructions executable by the at least one processing resource to:
        set a reserved power value for the network device, wherein the reserved power value comprises a predetermined amount of power utilized by the one or more support components;
        in response to detecting a fault that interrupts a flow of power from the plurality of PSUs to one or more of the plurality of PoE interfaces, determine a total operational power value based on an operational power value of each operational PSU of the plurality of PSUs;
        determine a total available power value based on the total operational power value and the reserved power value for the network device; and
        for each of the plurality of PoE interfaces:
            determine whether a threshold power value of the PoE interface exceeds the total available power value; and in response to determining that the threshold power value of the PoE interface exceeds the total available power value, power down the PoE interface.

15. The network device of claim 14, comprising:
a power distributor, wherein the plurality of PSUs are configured to provide power to the plurality of PoE interfaces via the power distributor.

16. The network device of claim 14, wherein each of the plurality of PoE interfaces is coupled to a Powered Device (PD) via an Ethernet connection.

17. The network device of claim 14, wherein the operational power value of each operational PSU of the plurality of PSUs corresponds to a ratio of a power output capacity of the operational PSU to a total power output capacity of the operational PSUs.

18. The network device of claim 14, wherein the instructions to determine the total operational power value comprise instructions, executable by the at least one processing resource, to sum up the operational power value of each operational PSU of the plurality of PSUs.

19. The network device of claim 14, wherein the instructions to determine the total available power value comprise instructions, executable by the at least one processing resource, to subtract the reserved power value from the total operational power value.

20. A non-transitory machine-readable storage medium comprising instructions executable by at least one processing resource, of a network device, to:
set a reserved power value for the network device, wherein the network device comprises a plurality of Power Supply Units (PSUs) and a plurality of Power over Ethernet (PoE) interfaces that receive power from the plurality of PSUs;
set a threshold power value for each of the plurality of Power over Ethernet (PoE) interfaces;
in response to detecting a fault that interrupts a flow of power from the plurality of PSUs to one or more of the plurality of PoE interfaces, determine a total operational power value based on an operational power value of each operational PSU of the plurality of PSUs;
determine a total available power value based on the total operational power value and the reserved power value for the network device; and
for each of the plurality of PoE interfaces:
determine whether a threshold power value of the PoE interface exceeds the total available power value; and
in response to determining that the threshold power value of the PoE interface exceeds the total available power value, power down the PoE interface.

\* \* \* \* \*